US009160443B2

United States Patent
Tronc et al.

(10) Patent No.: US 9,160,443 B2
(45) Date of Patent: Oct. 13, 2015

(54) MULTI-BEAM SATELLITE TELECOMMUNICATIONS SYSTEM AND METHOD FOR FORMING BEAMS

(75) Inventors: Jerome Tronc, Saint Jean (FR); Laurent Bouscary, Sainte Foy d'Aigrefeuille (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 993 days.

(21) Appl. No.: 12/891,144

(22) Filed: Sep. 27, 2010

(65) Prior Publication Data

US 2011/0076956 A1    Mar. 31, 2011

(30) Foreign Application Priority Data

Sep. 28, 2009    (FR) ...................................... 09 56709

(51) Int. Cl.
*H04B 7/00* (2006.01)
*H04B 7/185* (2006.01)

(52) U.S. Cl.
CPC .................................. *H04B 7/18515* (2013.01)

(58) Field of Classification Search
CPC .......... H04B 7/14; H04B 7/155; H04B 7/185; H04B 7/18502; H04B 7/1851; H04B 7/18513; H04B 7/18515; H04B 7/18517; H04B 7/18519; H04B 7/18521; H04B 7/1853
See application file for complete search history.

(56) References Cited

U.S. PATENT DOCUMENTS

| | | | | |
|---|---|---|---|---|
| 5,903,549 | A | * | 5/1999 | von der Embse et al. ..... 370/310 |
| 6,571,081 | B1 | * | 5/2003 | Reinhardt .................... 455/12.1 |
| 2008/0001812 | A1 | | 1/2008 | Jalali |
| 2008/0051080 | A1 | | 2/2008 | Walker et al. |

FOREIGN PATENT DOCUMENTS

| | | |
|---|---|---|
| EP | 0860952 A2 | 8/1998 |
| FR | 2928510 A1 | 9/2009 |
| GB | 2318947 A | 5/1998 |

OTHER PUBLICATIONS

International Search Report, dated Apr. 21, 2010, from corresponding French application.

* cited by examiner

*Primary Examiner* — Fanghwa Wang
(74) *Attorney, Agent, or Firm* — Young & Thompson

(57) ABSTRACT

A multi-beam telecommunications satellite, intended to be placed in orbit around the earth, and adapted to relay data between terrestrial terminals and at least one ground station and to form beams on a user link between the satellite and terrestrial terminals, includes a module for forming beams on board in the satellite, a module for processing beams in the ground station, and a module for routing signals received from the ground station and/or from terrestrial terminals, signals of beams formed on board being routed towards the on-board beam forming module, and signals of ground-formed beams being routed towards the ground-formed beam processing module. A telecommunications system including the multi-beam satellite, a ground station and a beam management center adapted to divide the beams into one group of ground-formed beams and one group of beams formed on board, as well as a method for forming beams are disclosed.

16 Claims, 3 Drawing Sheets

MULTI-BEAM SATELLITE TELECOMMUNICATIONS SYSTEM AND METHOD FOR FORMING BEAMS

The present invention belongs to the field of satellite telecommunications. More particularly, the present invention relates to a multi-beam satellite, a multi-beam satellite telecommunications system as well as a method for forming beams.

The present invention especially applies to civil spatial telecommunications systems using satellites in orbit around the earth, for relaying data between terrestrial terminals and at least one ground station.

In such a system, a satellite exchanges data on at least two radiofrequency links: a first link with the terrestrial terminals, called "user link", and a second link with the ground station, called "connection link".

More particularly, the present invention relates to multi-beam satellites comprising an array of antennas. Here, "array of antennas" means an array of radiating elements adapted to forming beams.

A beam corresponds to a particular radiofrequency radiation diagram of the satellite, which enables to serve a particular geographical area on the earth surface. A multi-beam satellite is adapted to form a plurality of such beams, and therefore to serve simultaneously a plurality of different geographical areas.

Sub-bands of a radiofrequency band are most often allocated to the geographical areas according to a repetition pattern in which different sub-bands are used by beams of adjacent geographical areas in order to limit co-frequency interferences between said geographical areas.

In order to form a beam on the user link from a given signal, in the down-path of said user link, a version of the signal, weighted by a phase and amplitude weighting coefficient specific to each emitting antenna and to the beam to be formed, is generally emitted by each antenna of the antenna array.

In an up-path of the user link, a beam is formed by combining signals received by each array antenna, which are weighted by said weighting coefficients.

The weighting coefficients are determined for guaranteeing the formation of a given radiation diagram, and are generally ground calculated.

Indeed, the calculation capacities of the processors on board in the multi-beam satellites are currently strongly limited by constraints such as mass, electrical power consumed and thermal dissipation, and it generally proves more disadvantageous to add the calculation of the weighting coefficients to the jobs performed by said processors than to make them calculated by a ground station.

Two approaches are known and implemented in the current multi-beam satellites: one approach called "On-Board Beam Forming" (OBBF) and a second approach called "Ground-Based Beam Forming" (GBBF).

In the case of an on-board beam forming, the weighting coefficients are applied in the satellite. Generally, the weighting coefficients are previously calculated in a ground station.

The so-obtained beams essentially aims at serving predefined geographical areas the distribution of which varies very little with time because any actualization of the coefficients requires a reconfiguration of the processor, which can sometimes take several minutes.

In the case of a ground-based beam forming, the weighting coefficients are applied in the ground station(s), i.e. the ground station transmits the weighted versions of the signals which are emitted by each antenna of the antenna array of the satellite (for forming beams in the down-path of the user link), or said satellite emits the signals, received by each antenna of the antenna array (for forming beams in the up-path of the user link), towards said ground station in order to linearly combine them therein.

As the weighting coefficients are ground applied by means of processors the performance of which is less limited than that of the processors on board in the satellites, the beams can be formed in a dynamic manner and advanced signal processing algorithms can be implemented.

However, the required bandwidth for the connection link is much more important than in the case of an on-board beam forming because the signals received or to be emitted by array antennas have to be exchanged on the intermediate link. If the satellite array comprises a number $N_E$ of antennas, the required bandwidth for the connection link will be up to $N_E$ times higher than the required bandwidth for the on-board beam forming.

SUMMARY OF THE INVENTION

The present invention aims at providing a solution for forming beams for telecommunications satellites which can be implemented by the processors currently on board in such satellites, while enabling the formation of dynamic and/or more complex beams, notably for suppressing interferences between users in the up-path or down-path of the user link.

In the first aspect, the present invention relates to a device intended to be placed on board in a multi-beam telecommunications satellite adapted to relay data between terrestrial terminals and at least one ground station. The device comprises a module for forming beams on board in the satellite, a module for processing beams ground formed in the ground station, and a module for routing signals received from the ground station and/or from terrestrial terminals, signals of beams formed on board being routed towards the on-board beam forming module, and signals of ground-formed beams being routed towards the ground-formed beam processing module.

Preferably, for forming beams in the down-path of the user link, the device comprises a module for combining signals of on-board-formed beams and signals of ground-formed beams.

In a second aspect, the present invention relates to a satellite comprising a device according to the invention. Preferably, the satellite comprises an array of antennas for exchanging data on the user link, used both for the on-board-formed beams and for the ground-formed beams.

In a third aspect, the present invention relates to a management center for a multi-beam satellite telecommunications system in which data are exchanged between terrestrial terminals and at least one ground station via at least one multi-beam satellite, data being exchanged on a user link between the satellite and terrestrial terminals by forming beams in a down-path and/or an up-path of said user link. The management center comprises means for dividing the beams to be formed into two groups of beams: one group of beams ground formed in the ground station and one group of beams formed on board in the satellite. Preferably, the beam dividing means are configured to divide the beams into the two groups of beams according to a user context of the terrestrial terminals.

Preferably, the beam dividing means are configured to divide the beams according to a criterion of mobility and/or a criterion of data rate and/or a criterion of localization and/or a criterion of radiofrequency characteristics of a terrestrial terminal or of a group of terrestrial terminals for which a beam must be formed.

Preferably, the management center comprises means for coordinating the co-existence of on-board-formed beams and ground-formed beams.

In a fourth aspect, the present invention relates to a telecommunications system comprising at least one multi-beam satellite according to the invention, at least one ground station comprising a ground-based beam forming module and a management center according to the invention.

Preferably, the ground station of the telecommunications system comprises a module for processing beams formed on board in the satellite and a module for routing signals towards/from the satellite, signals of beams formed on board in the satellite being routed towards the on-board-formed beam processing module, and signals of ground formed beams being routed towards the ground-based beam forming module.

In a fifth aspect, the present invention concerns a method for forming beams on a user link between a multi-beam satellite and terrestrial terminals, data being exchanged via the satellite between said terrestrial terminals and at least one ground station. The method for forming beams comprises a step of dividing beams to be formed into two groups of beams, one group of beams formed on board in the satellite and one group of beams ground formed in the ground station, a step of forming on board beams of the group of beams formed on board in the satellite, and a step of ground forming beams of the group of beams formed in the ground station.

Preferably, the beams to be formed are divided into both groups of beams according to a user context of the terrestrial terminals.

Preferably, the beams formed on board in the satellite are static or semi-static beams, and the beams ground formed are dynamic beams.

Preferably, the beams are divided according to a criterion of mobility and/or a criterion of data rate and/or a criterion of localization and/or a criterion of radiofrequency characteristics of a terrestrial terminal or of a group of terrestrial terminals for which a beam must be formed.

Preferably, all the beams are formed on board when a connection link, between the satellite and the ground station, is subject to considerable disturbances.

BRIEF DESCRIPTION OF THE DRAWINGS

The following description of the invention is given in reference to the figures in which the same reference numbers designate identical or analog elements, representing in a non-limitative manner.

DETAILED DESCRIPTION OF THE PREFERRED EMBODIMENTS

Figure 1:
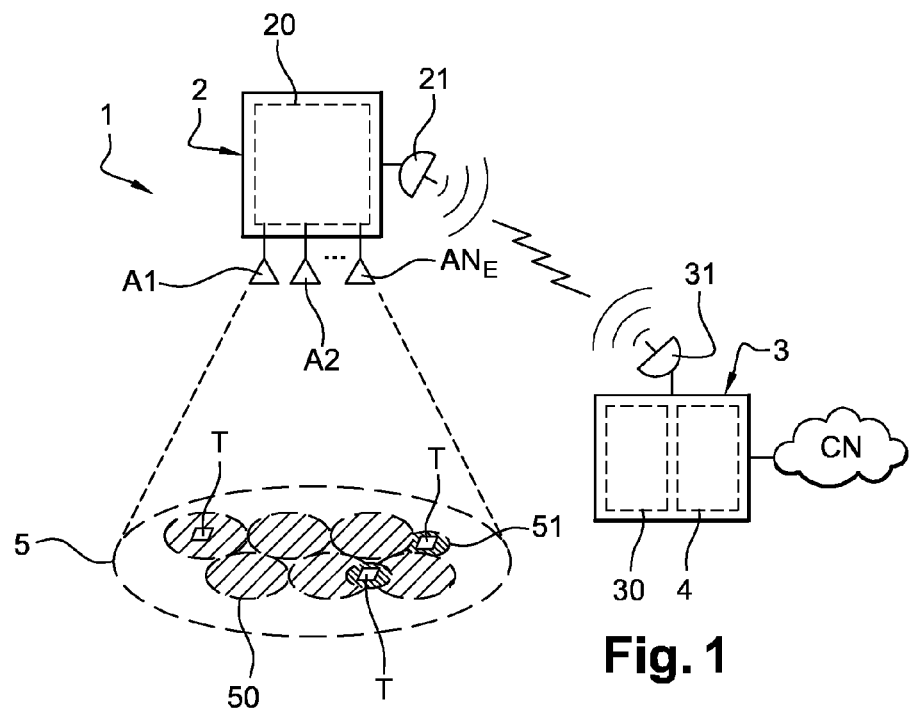
FIG. 1: a schematic representation of a multi-beam telecommunications system according to the invention.

In a satellite telecommunications system 1 according to the invention, schematically represented in FIG. 1, data are exchanged between terrestrial terminals T and at least one ground station 3 connected to a satellite core network (CN), via at least one multi-beam satellite 2 in orbit around the earth.

The satellite 2 comprises an array of $N_E$ antennas An, $1 \leq n \leq N_E$, for exchanging data with terrestrial terminals.

The telecommunications system 1 is adapted, via the multi-beam satellite 2, to serve, preferably simultaneously, different geographical areas, by forming different beams. Such beams are formed either in the up-path or in the down-path of the user link between the terrestrial terminals T and the satellite 2. Preferably, beams are formed both in the up-path and the down-path of said user link.

In the context of the invention, a terrestrial terminal is mobile or immobile, and can be located anywhere in a coverage area 5 of the user link, including in an aircraft (plane, helicopter, etc.). A terrestrial terminal can also be a relay station enabling to relay data received from the satellite 2 towards a plurality of other terrestrial terminals.

The satellite 2 can be placed on any type of orbit, for example on a Low Earth orbit (LEO), on a Medium Earth Orbit (MEO) or, preferably, on a High Earth Orbit such as the Geostationary Earth orbit (GEO).

The array of antennas An of the satellite 2 is, according to non-limitative examples, an array of direct radiating antennas or an array of antennas of Array-Fed-Reflector type.

The user link, between the terrestrial terminals T and the satellite 2, and the connection link, between the satellite 2 and the ground station 3, are radiofrequency links. Each of the user or connection links is preferably bidirectional, i.e. data can be exchanged both in an up-path towards the satellite 2 and a down-path from said satellite. On the user and connection links, control information for configuring the exchange of data on said links can also be exchanged.

The user and connection links can use different radiofrequency bands. Moreover, different radiofrequency bands can be used in the up-path and in the down-path of said user and connection links.

It must be noted that the invention is not limited to a particular type of radiofrequency band, and a particular choice of a radiofrequency band is only a possible variant of implementation. Bands Ka, Ku, L etc. are non-limitative examples thereof.

For the purpose of describing embodiments of the invention, it is considered in a non-limitative manner that the radiofrequency bands are divided into sub-bands which are allocated to different beams.

Preferably, it is the case when data from terrestrial terminal of the same geographical area are time-multiplexed on the same sub-band, or when said data are multiplexed by means of orthogonal or pseudo-orthogonal spreading codes.

According to other examples, it is possible to have, in the same beam, a plurality of sub-bands. For example, it is the case when data from different terrestrial terminals, in the geographical area served, are frequency-multiplexed.

In the context of the invention, a "signal" corresponds to the data of a terrestrial terminal or a group of terrestrial terminals, after they have been shaped by implementing methods out of the scope of the invention (channel coding, modulation, etc.). Such a signal is either a base-band signal, a signal on an intermediate frequency or a signal in the sub-band associated to the beam formed.

Besides the array of antennas An, the satellite 2 comprises an on-board device for processing beams, called board processing device 20.

Figure 2A:
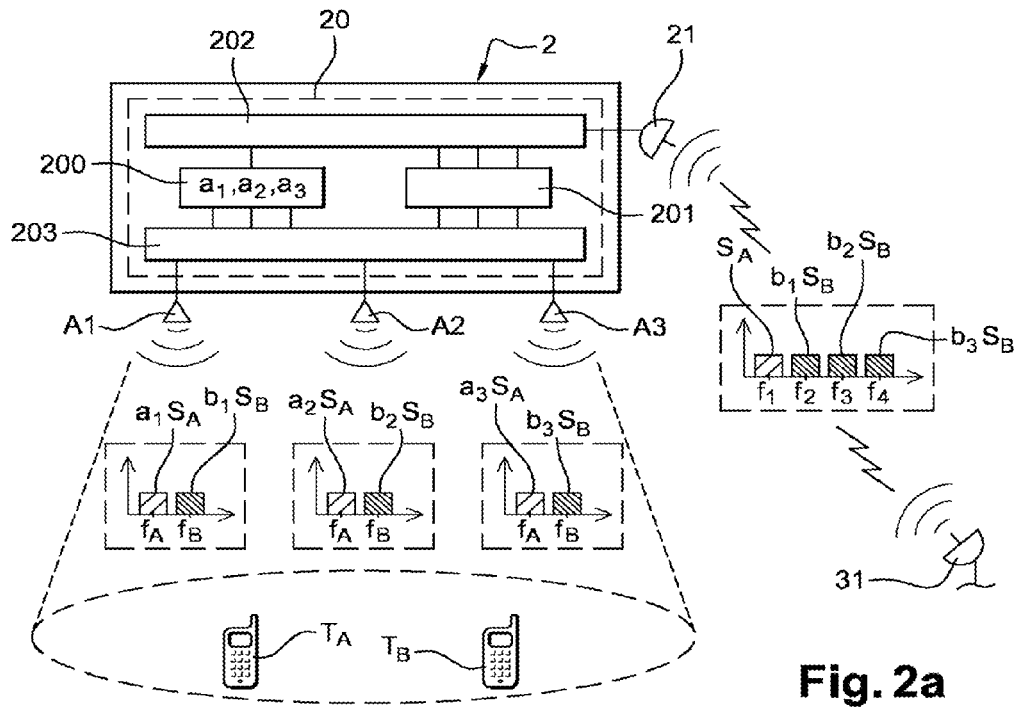
FIGS. 2a and 2b: schematic representations of a satellite according to the invention, for forming beams in the down-path and the up-path of the user link, respectively.
Figure 2B:
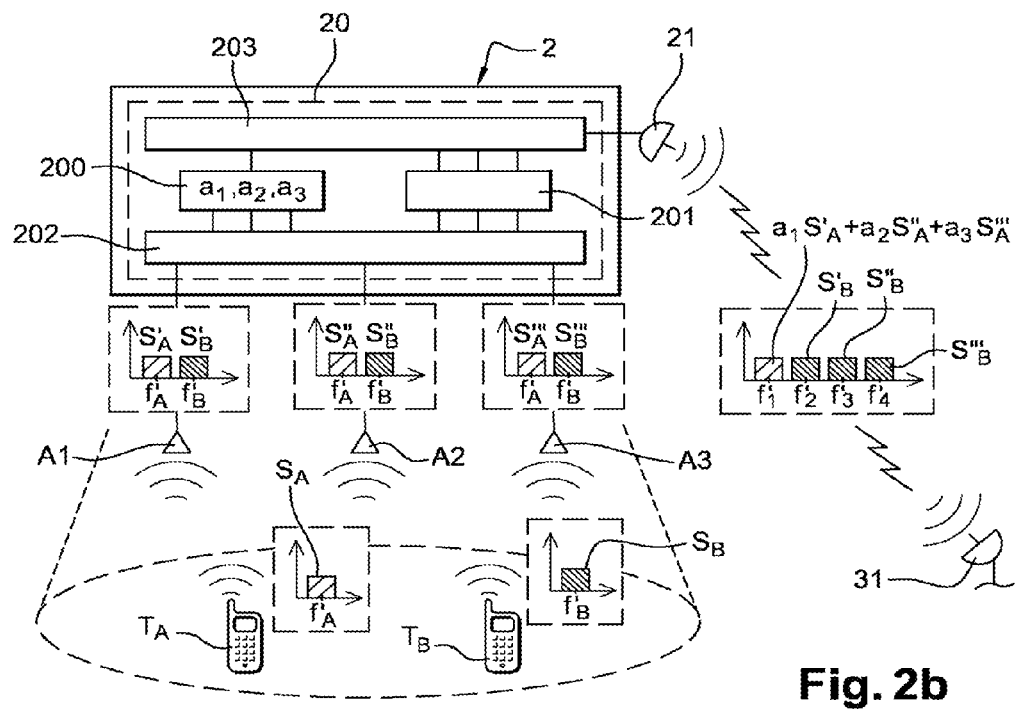

In a preferred embodiment of the board processing device 20, which can be seen in FIGS. 2a and 2b, it comprises:

a module 200 for forming beams on board, which module implements the on-board functions of on-board beam forming, in particular the application of the weighing coefficients, a module 201 for processing ground-formed beams, the main function of which is to relay the signals of ground-formed beams between the ground station 3 and the array of antennas An, a module 202 for routing signals received from the ground station and/or from terrestrial terminals, signals of beams formed on board being routed towards the on-board beam forming module, and signals of ground-formed beams being routed towards the ground-formed beam processing module.

Thus, the multi-beam satellite 2 supports both the formation of beams on board, preferably for the formation of static beams serving geographical areas the distribution of which varies very little in time, and the formation of beams in the ground station 3, preferably for the formation of dynamic beams being able to implement advanced signal processing algorithms.

In a particular embodiment, the same array of antennas An, and preferably the associated radiofrequency frontends, is used for the on-board-formed beams and for the ground-formed beams, in the up-path and/or the down-path. This embodiment is advantageous in that the material resources (and the associated calibration operations) to be introduced for supporting both a formation of beams on board and a formation of beams on the ground are limited by the sharing of some material resources.

In the case, considered thereafter, the same array of antennas An is used for the on-board-formed beams and the ground-formed beams, the board processing device 20 further comprises a module 203 for combining, in the down-path of the user link and on each array antenna, signals of on-board-formed beams and signals of ground-formed beams.

For exchanging data with the ground station 3, the satellite 2 comprises at least one antenna, called connection antenna 21. In the same manner as for the array of antennas An, the same connection antenna 21 is preferably used for signals of on-board-formed beams and signals of ground-formed beams. The satellite 2 comprises in that case a module 203 for combining, in the down-path of the connection link, signals of on-board-formed beams and signals of ground-formed beams.

The FIGS. 2a and 2b represent, very schematically, some elements of the satellite 2, more particularly the board processing device 20, the array of antennas An, and the connection antenna in the case of a formation of beams in the down-path and the up-path of the user link, respectively.

In the FIGS. 2a and 2b, it is considered, in a non-limitative manner for figures' clarity sake:
an array comprising three antennas A1, A2 and A3,
the on-board formation of a beam, for a terrestrial terminal $T_A$, and
the ground formation of a beam, for a terrestrial terminal $T_B$.

In the FIGS. 2a and 2b, the references $S_A$, $S'_A$, $S''_A$ and $S'''_A$ designate signals of beams to be formed on board in the satellite 2, and the references $S_B$, $S'_B$, $S''_B$ and $S'''_B$ designate signals of beams ground-formed in the ground station 3. The weighting coefficients to be applied (in the up-path and in the down-path) for forming the beam for the terrestrial terminal $T_A$ are designated by $a_1$, $a_2$ and $a_3$, and the weighting coefficients to be applied for forming the beam for the terrestrial terminal $T_B$ are designated by $b_1$, $b_2$ and $b_3$.

In the examples described, it is considered that the different signals exchanged on the connection link are frequency-multiplexed, i.e. exchanged on different sub-bands. That example is not limitative of the invention: according to other examples, said signals are multiplexed in time, multiplexed by spreading by means of orthogonal or pseudo-orthogonal codes etc.

It is considered, also in a non-limitative manner, that the beams are frequency-multiplexed on the user link, as previously indicated. It will be noted that the same sub-band can however be used for beams serving different geographical areas, sufficiently far away from one another so that the co-frequency interferences are limited by the formation of beams (spatial multiplexing operation).

In the FIG. 2a, the satellite receives on its connection antenna 21 signals, frequency-multiplexed, corresponding to different beams, which are in the represented example:
the signal $S_A$, towards the terrestrial terminal $T_A$, on a sub-band designated by $f_1$,
the signals $b_1 S_B$, $b_2 S_B$ and $b_3 S_B$ towards the terrestrial terminal $T_B$, corresponding to the weighted versions of the signal $S_B$, formed in the ground station 3, on sub-bands designated by $f_2$, $f_3$ and $f_4$, respectively.

The routing module 202 carries out for example a de-multiplexing operation, and preferably comprises filters the patterns of which are adapted to the different sub-bands, for separating signals of on-board-formed beams from signals of ground-formed beams.

The signal $S_A$ is routed towards the module 200 for forming beams on board, and the signals $b_1 S_B$, $b_2 S_B$ and $b_3 S_B$ are routed towards the module 201 for processing ground-formed beams. According to other examples, the routing module 202 can perform no separation of the signals, and can simply route the signals received on the connection antenna 21 towards both the module 200 for forming beams on board and the module 201 for processing ground-formed beams (the separation being then carried out by the module 201 for processing ground-formed beams and the module 200 for forming beams on board).

The module 200 for forming beams on board applies the weighting coefficients $a_1$, $a_2$ and $a_3$, for each beam to be formed, and can carry out a frequency-translation of the signal $a_1 S_A$, $a_2 S_A$ and $a_3 S_A$, for a transmission on the sub-band, designated by $f_A$, allocated to the beam towards the terrestrial terminal $T_A$, for the frequency-multiplexing of the beams.

The module 201 for processing ground-formed beams can de-multiplex the signals $b_1 S_B$, $b_2 S_B$ and $b_3 S_B$, if they are still multiplexed. The module 201 for processing ground-formed beams can also carry out a frequency translation of said signals $b_1 S_B$, $b_2 S_B$ and $b_3 S_B$, in order to transmit them on the same sub-band, designated by $f_B$, allocated to the beam towards the terrestrial terminal $T_B$, for the frequency multiplexing of the beams.

In the FIG. 2a, the satellite 2 comprises a module 203 for combining the signals of beams formed on board in the satellite 2 and the signals of ground-formed beams, which module mainly carries out the summation of the frequency-multiplexed beams. The signals $a_1 S_A$ and $b_1 S_B$ are combined for the antenna A1, the signals $a_2 S_A$ and $b_2 S_B$ are combined for the antenna A2 and the signals $a_3 S_A$ and $b_3 S_B$ are combined for the antenna A3.

In the FIG. 2b, it is considered that the terrestrial terminal $T_A$ has emitted a signal $S_A$ on a sub-band $f'_A$ towards the satellite 2, and that the terrestrial terminal $T_B$ has emitted a signal $S_B$ on a sub-band $f'_B$ towards the satellite 2. The signals $S_A$ and $S_B$ are received by each of the antennas A1, A2 and A3 of the array of the satellite 2 in the form of signals $S'_A$, $S''_A$ and $S'''_A$ for the signal $S_A$, and $S'_B$, $S''_B$ and $S'''_B$, for the signal $S_B$, respectively.

The routing module 202 carries out for example a de-multiplexing operation and preferably comprises filters the patterns of which are adapted to the different sub-bands for separating the signals of on-board-formed beams from signals of ground-formed beams.

According to other examples, the routing module 202 does not perform any separation the signals and can simply route the signals received by each antenna A1, A2 and A3 towards the on-board beam forming module 200 and the ground-formed beam processing module 201; for example, it can be the case when the beams $S_A$ and $S_B$ are essentially spatially multiplexed, the separation of said signals received being obtained when forming the beams.

The on-board beam forming module 200 carries out a linear combination of the signals $S'_A$, $S''_A$ and $S'''_A$ by means of the weighting coefficients $a_1$, $a_2$ and $a_3$, in order to obtain a signal $a_1 S'_A + a_2 S''_A + a_3 S'''_A$. This signal can be frequency translated in order to be transmitted on a sub-band $f_1$ of the connection link, for carrying out a frequency multiplexing operation on the connection link.

The ground-formed beam processing module 201 carries out the multiplexing operation for the signals $S'_B$, $S''_B$ and $S'''_B$, which corresponds, in the example illustrated, to a frequency translation of said signals $S'_B$, $S''_B$ and $S'''_B$, in order to be transmitted on the sub-bands $f_2$, $f_3$ and $f_4$, for carrying out a frequency multiplexing operation on the connection link.

In the FIG. 2b, the satellite 2 comprises a module 203 for combining signals of beams formed on board in the satellite 2 and signals of ground-formed beams, which mainly carries out the summation, for the connection antenna 21, of the signal $a_1 S'_A + a_2 S''_A + a_3 S'''_A$ and the signals $S'_B$, $S''_B$ and $S'''_B$.

Figure 3:
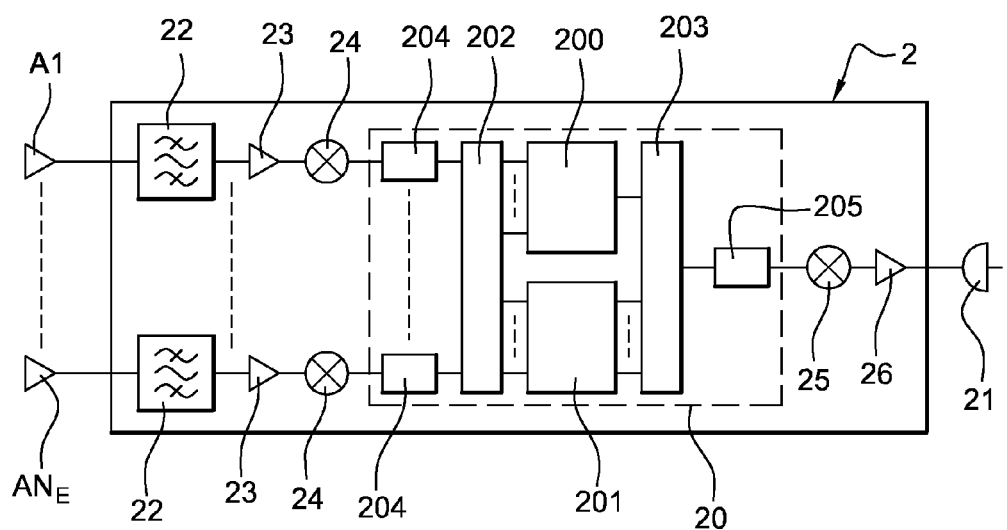
FIG. 3: a schematic representation of an architecture example of a device, placed on board in the satellite, for forming beams.

In a preferred embodiment of the board processing device 20, represented in the FIG. 3 in the case of a beam formation in the up-path of the user link, the operations carried out by the different modules in the board processing device 20 are carried out on digital signals.

The signals received by the antennas An of the antenna array are for example filtered 22, amplified by means of low-noise amplifiers 23, frequency translated to an intermediate frequency by means of multiplier circuits and local oscillators.

After the processing by the board processing device 20, analog signals, preferably centered on an intermediate frequency, are for example translated 25 to a higher frequency by means of multiplier circuits and of local oscillators, and amplified by means of a power amplifier 26.

The board processing device 20 preferably comprises a central processing unit, for example a processor on board in the satellite 2, connected inter alia to a storage unit (hard drive, RAM and/or ROM memory, etc.) and to interfacing means (analog/digital converters 204 and digital/analog converter 205 in the FIG. 3) via one or more communication buses.

Instruction codes are memorized in said storage unit and, when they are executed by the central processing unit, this central processing unit is adapted to execute the functions of the different modules of the board processing device 20. According to some embodiments, a number of said functions are executed by specialized integrated circuits, such as ASIC, FPGA, etc. which can be configured by the central processing unit of the board processing device 20.

Other architectures are possible for the board processing device 20, and it is easily understood that the choice of a particular architecture is only a possible variant for implementing the invention.

In particular, some modules of the board processing device 20, or even all the modules, can be totally or partially realized by means of analog components. For example, the module 201 for processing ground-formed beams, the routing module 202 and, if need be, the combination module(s), can be composed of analog filters, multiplier circuits, local oscillators, couplers, etc.

The ground station 3 comprises at least one connection antenna 31 for exchanging data on the connection link, and a ground-based beam forming device, called "ground processing device" 30.

Figure 4A:
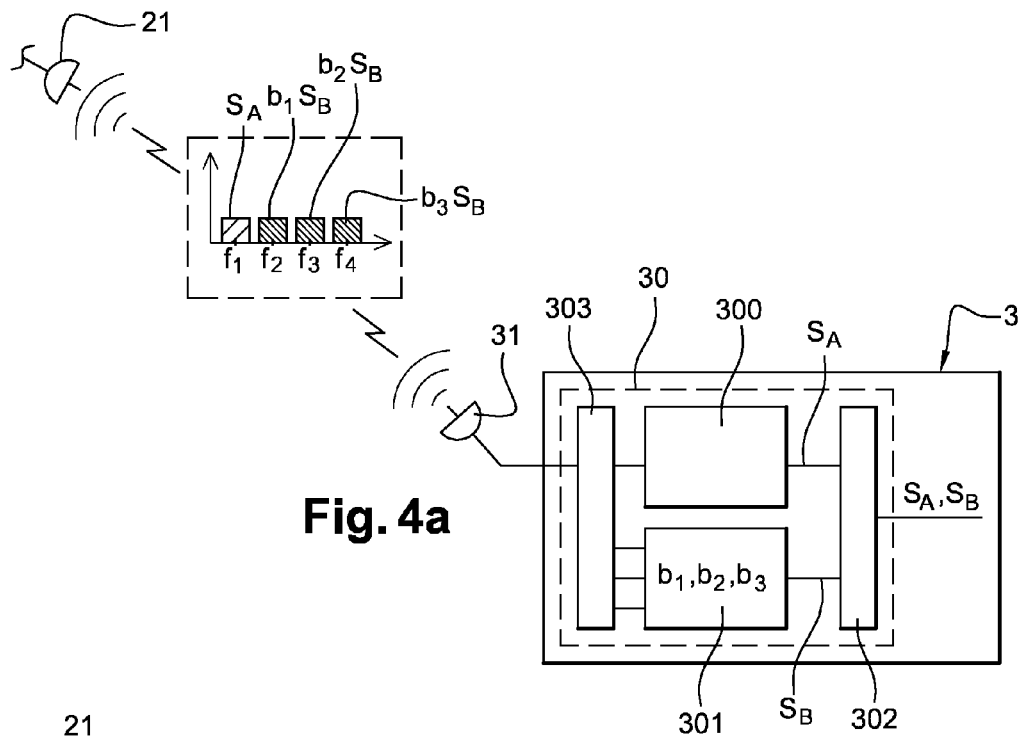
FIGS. 4a and 4b: schematic representations of a ground station according to the invention, for forming beams in the down-path and the up-path of the user link, respectively.
Figure 4B:
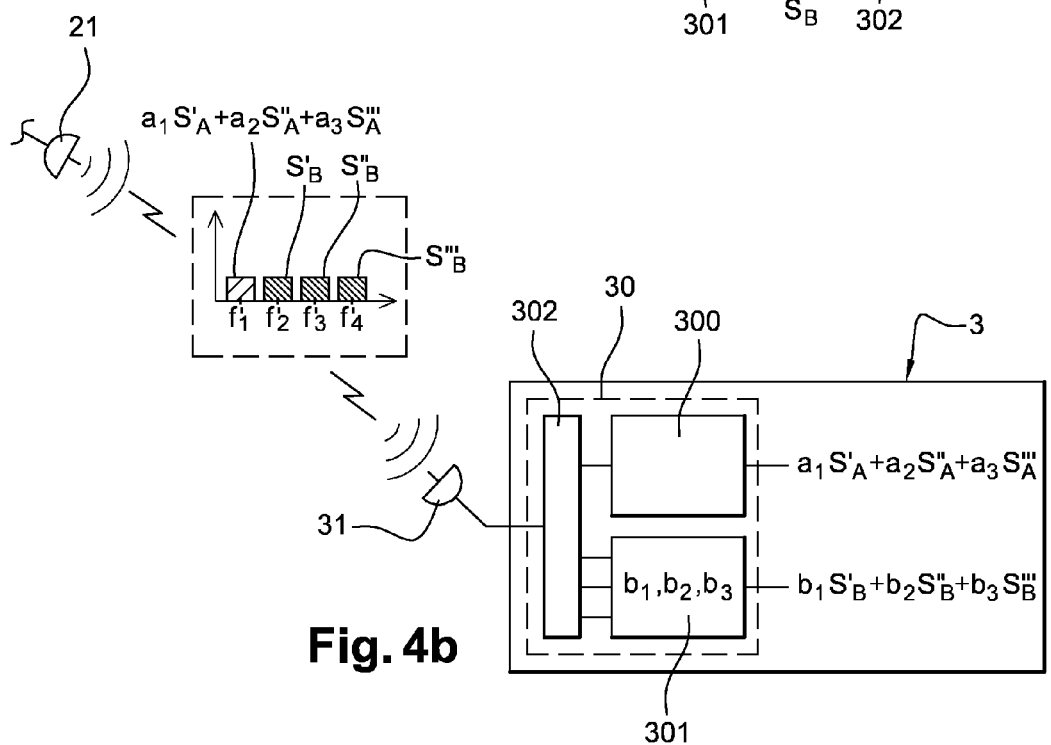

In a preferred embodiment, visible in the FIGS. 4a and 4b, the ground processing device 30 comprises:
- a ground-based beam forming module 301, which is functionally associated to the ground-formed beam processing module 201 in the satellite 2,
- an on-board-formed beam processing module 300, which is functionally associated to the on-board beam forming module 200 in the satellite 2,
- a routing module 302 for the signals towards and/or from the satellite 2, signals of beams formed on board in the satellite being routed towards the on-board-formed beam processing module 300, and signals of ground-formed beams being routed towards the ground-based beam forming module 301.

In a particular embodiment, the same connection antenna 31 is used for signals of on-board formed beams and for signals of ground-formed beams. The ground station 3 comprises in this case a combination module 303, in the up-path of the connection link, for combining signals of on-board-formed beams and signals of ground-formed beams.

The FIGS. 4a and 4b represent, very schematically, some elements of the ground station 3, more particularly the ground processing device 30 and the connection antenna, in the case of a formation of beams in the up-path and down-path of the user link, respectively.

The same conventions as in the FIGS. 2a and 2b are used in the FIGS. 4a and 4b. The FIG. 4a represents, on the ground station 3 side, the treatments preceding those represented in the FIG. 2a, whereas the FIG. 4b represents the treatments following those represented in the FIG. 2b.

In the FIG. 4a, the ground station 3 must process the signal $S_A$ towards the terrestrial terminal $T_A$, and the signal $S_B$ towards the terminal $T_B$.

The routing module 302 routes the signal $S_A$ towards the on-board-formed beam processing module 300, and the signal $S_B$ towards the ground-based beam forming module 301.

The ground-based beam forming module 301 applies the weighting coefficients $b_1$, $b_2$ and $b_3$, and can carry out a frequency translation of the signals $b_1 S_B$, $b_2 S_B$ and $b_3 S_B$ in order to multiplex them with the signal $S_A$ and transmit them on the sub-bands $f_2$, $f_3$ and $f_4$.

The on-board-formed beam processing module 300 carries out for example a frequency translation of the signal $S_A$ in order to multiplex it with the signals $b_1 S_B$, $b_2 S_B$ and $b_3 S_B$, and transmit it on the sub-band $f_1$.

In the FIG. 4a, the ground station 3 comprises a combination module 303 for the signals of beams formed on board in the satellite 2 and for the signals of ground-formed beams, which mainly carries out a summation, for the connection antenna 31, of the frequency-multiplexed signals $S_A$, $b_1 S_B$, $b_2 S_B$ and $b_3 S_B$.

In the FIG. 4b, the ground station 3 receives on the connection antenna 31 a signal $a_1S'_A+a_2S''_A+a_3S'''_A$, and the signals $S'_B$, $S''_B$ and $S'''_B$, frequency-multiplexed and transmitted on sub-bands $f_1$, $f_2$, $f_3$ and $f_4$, respectively.

The signal $a_1S'_A+a_2S''_A+a_3S'''_A$ is routed towards the on-board-formed beam processing module 300, and the signals $S'_B$, $S''_B$ and $S'''_B$, are routed towards the ground-based beam forming module 301.

The ground-based beam forming module 301 carries out a linear combination of the signals $S'_B$, $S''_B$ and $S'''_B$ by means of the weighting coefficients $b_1$, $b_2$ and $b_3$ in order to obtain a signal $b_1S'_B+b_2S''_B+b_3S'''_B$, preferably brought back to baseband.

The on-board-formed beam processing module 300 can carry out for example a frequency translation of the signal $a_1S'_A+a_2S''_A+a_3S'''_A$, in order to bring it back to base-band.

In the same way as for the board processing device 20, the ground processing device 30 preferably comprises a central processing unit, for example a processor, and a storage unit (hard drive, RAM and/or ROM memory, etc.) connected via a communication bus. Instruction codes are memorized in said storage unit and, when they are executed by the processor, it is adapted to execute the functions of the different modules of the ground processing device 30. According to some embodiments, a number of said functions are executed by specialized integrated circuits, such as ASIC, FPGA, etc., which can be configured by the central processing unit of the ground processing device 30.

The telecommunications system 1 also comprises a beam management center 4. In the example represented in the FIG. 1, the beam management center is included in the ground station 3 comprising the ground processing device 30. According to other examples, the beam management center 4 can be included in another ground station, distributed between the ground station 3 and the satellite 2, etc.

The beam management center 4 preferably comprises a central processing unit connected to a storage unit, in which instruction codes are memorized for implementing different functions of said beam management center.

The function of the beam management center 4 is to configure the different beams to be formed on the user link.

In particular the function of the beam management center 4 is to determine the number and the type of beams to be formed according to a user context.

The user context is a list of parameters associated to each terrestrial terminal, or group of terrestrial terminals. Different types of parameters can be taken into account in the user context; the following parameters can be cited as non-limitative examples:
- the localization: for example an identifier of a geographical area in the case of a static distribution, GPS coordinates, etc.,
- the estimated ratio C/N+I (signal to noise plus interferences ratio),
- the emission power,
- the type of terrestrial terminal: for example, the maximum data rate supported in the down-path and/or up-path, the services to which the owner of the terrestrial terminal has subscribed,
- the radiofrequency characteristics of the terrestrial terminal: for example, the Equivalent Isotropically Radiated Power (EIRP), the noise factor of the radiofrequency frontend, the antenna gain of the terrestrial terminal, etc.
- the current data rate, and/or the desired data rate,
- the speed of displacement.

According to the user context, the beam management center 4 determines the number and the type of beams to be formed, the beams to be formed being divided into at least two groups of beams: one first group of beams formed on board in the satellite 2, and one group of beams ground formed in the ground station 3. The beam management center 4 configures the board processing device 20 and the ground processing device 30 in order that they can form the beams formed on board in the satellite and the ground formed beams, respectively.

The beams formed on board in the satellite 2 are preferably substantially static beams, i.e. beams serving geographical areas on the earth surface, the distribution of which changes very little with time. The weighting coefficients for the formation of said static beams change very little with time; however, it will be noted that they can be modified for instance to take into account estimated deviations, in position and attitude, of the satellite 2. Preferably, a static beam is allocated by default to a terrestrial terminal or group of terrestrial terminals.

The ground formed beams, in the ground station 3, are preferably dynamic beams, adapted to the context of terrestrial terminals T, or groups of terrestrial terminals T, which can implement advanced signal processing methods. The weighting coefficients are ground calculated, in the beam management center 4 and/or in the ground processing device 30 in the ground station 3, according to the use context of the dynamic beam to be formed.

For example, in the case of a terrestrial terminal T, immobile and exchanging data with the satellite 4 at a low data rate, the beam management center 4 allocates to this terrestrial terminal T a static beam, possibly shared with other terrestrial terminals, which beam will be formed on board in the satellite 2.

According to another example, in the case of a terrestrial terminal T, immobile and desiring to exchange data with the satellite 2 at a high data rate, the beam management center 4 can allocate to this terrestrial terminal T a dynamic beam, possibly shared with other terrestrial terminals, which beam will be formed on the ground.

This will be the case when the estimated ratio C/N+I proves to be insufficient for the data exchange at the desired data rate, and when the implementation of advanced signal processing methods can improve the ratio C/N+I. It is for instance possible to calculate weighting coefficients (in particular for the formation of beams in the up-path of the user link) which enable to suppress, totally or partially, interferences coming from a given direction different from the direction of the terrestrial terminal for which one tries to improve the ratio C/N+I.

According to another example, the beam management center 4 can allocate a dynamic beam to a terrestrial terminal if a given ratio C/N+I can not be reached with a static beam, considering the radiofrequency characteristics of said terrestrial terminal (for example because of a noise factor superior to those of the other terrestrial terminals, etc.).

According to another example, if the localization of a terrestrial terminal is such that its ratio C/N+I is low, notably at the coverage borderline of a static beam, a dynamic beam will then be allocated to said terrestrial terminal in order to improve said ratio C/N+I.

According to another example, in the case of a terrestrial terminal T, mobile at a high speed, for example in the case of a terrestrial terminal T in a train or an aircraft (plane, helicopter, etc.), the beam management center 4 can allocate to this terrestrial terminal T a dynamic beam, which will follow the displacement of said terrestrial terminal, insofar as the allocation of a static beam would result in a regular switch of said terrestrial terminal from a static beam to another. The allocation of a dynamic beam is particularly advantageous if said terrestrial terminal is a relay point enabling to ground relay data towards a lot of other terrestrial terminals. In that case, the weighting coefficients are calculated so as to maximize the radiation diagram of the array of antennas An in the direction of said mobile terrestrial terminal.

According to another example, dynamic beams are allocated in the first place to terrestrial terminals T having priority, i.e. for terrestrial terminals T data of which are critical (terrestrial terminals of ambulance men/women, policemen/women, firefighters, first-aid workers, etc.) and/or terrestrial terminals T with a subscription aiming at guaranteeing an improved quality of service.

The capacity of ground forming beams or of forming beams on board in the satellite 2, and the utilization of the user context for determining the number of beams to be formed and for dividing said beams between two groups, one for ground formed beams, the other for the beams formed on board the satellite 2, enable to optimize the formation of beams on the user link.

Thus, the beams formed are, by default, static or semi-static, formed on board in the satellite 2. If a terrestrial terminal T or a group of terrestrial terminals needs an improved quality of service, which cannot be provided according to the user context by a static beam, a dynamic ground formed beam is allocated. In the FIG. 1, geographical areas served by beams formed on board are designated by the reference number 50, whereas geographical areas served by ground-formed beams are designated by the reference number 51.

It is easily understood that the performance on the user link is distinctly improved, in particular by the possibility of implementing advanced signal processing methods, whereas the impact on the required bandwidth on the connection link is limited by the fact that ground-formed beams are allocated to only some terrestrial terminals or groups of particular terrestrial terminals.

Preferably, the beam management center 4 coordinates the co-existence of static and dynamic beams.

Particularly, said beam management center preferably allocates sub-bands to different beams in order to reduce interferences, in particular co-frequency interferences, due to the spectral co-existence of said static and dynamic beams.

A simple way of coordinating said spectral co-existence consists in forming two groups of sub-bands: one first group of sub-bands for static beams, and one second group of sub-bands for dynamic beams. However, other ways of coordinating the spectral co-existence of static and dynamic beams can be implemented in the invention.

Preferably, the beam management center 4 coordinates, particularly in the down-path of the user link, the co-existence as regards the distribution of the radiofrequency power available on board in the satellite 2. Indeed, as said available radiofrequency power is limited, it must be distributed among the different beams, preferably by guaranteeing a minimum ratio C/N+I on each of said beams.

The coordination of static and dynamic beams can implement any resource management method known in the art.

The present invention also relates to a method for forming beams.

As previously described, the method for forming beams comprises a step of distributing the terrestrial terminals or groups of terrestrial terminals between both groups of beams i.e. the group of beams formed on board in the satellite and the group of ground-formed beams.

Preferably, but in a non-limitative manner, the distribution of the terrestrial terminals or groups of terrestrial terminals takes the user context into account, as previously described.

The method comprises the steps of:
  ground forming beams, mainly executed by the ground-based beam forming module 301 in the ground station 3,
  forming beams on board, mainly executed by the on-board beam forming module 200 in the satellite 2.

The steps of ground forming beams and of forming beams on board are executed in parallel, and use both the board processing device 20 and the ground processing device 30.

The step of ground forming beams comprises in particular a sub-step of calculating weighting coefficients, for the formation of beams adapted to the user context. Said weighting coefficients are calculated in the beam management center and/or the ground processing device.

The beams formed on board are preferably static or semi-static beams, so that the weighting coefficients are then less frequently actualized than the coefficients of ground-formed beams.

The division of the beams into the two groups is for example periodically actualized, or as soon as a change in the context, likely to result in a modification of the division, is detected.

The static beams, formed on board, are for example allocated by default to terrestrial terminals or groups of terrestrial terminals. The dynamic ground-formed beams are preferably allocated if, according to the user context, different criteria are fulfilled, for example:
  a criterion of mobility of the terrestrial terminal or group of terrestrial terminals: for example, a dynamic beam is allocated if the estimated speed is superior to a threshold speed,
  a criterion of data rate: for example, a dynamic beam is allocated if the data rate requires the implementation of advanced signal processing algorithms (suppression of interferences, etc.),
  a criterion of radiofrequency characteristics: for example a dynamic beam is allocated to a terrestrial terminal if its radiofrequency characteristics indicate a performance lower than that of the other terrestrial terminals,
  a requirement of localization: for example, a dynamic beam is allocated if a terrestrial terminal is located at the coverage limit of a static beam.

Preferably, the number of beams belonging to each group is variable, for a better adaptation to the user context. According to other examples, the number of beams in each group of beams is fixed, so that the same number of beams is always ground formed.

It is easily understood that, according to the user context, it is possible that, at a given time, the telecommunications system 1 forms beams exclusively on the ground or exclusively on board.

Moreover, according to a particular embodiment, the system 1 can switch all the beams to a formation on board in the satellite, independently of the user context. This embodiment proves to be particularly advantageous, in particular in the case when said system detects strong disturbances on the connection link, which disturbances could result in a strong deterioration of the quality of the ground-formed beams.

It is easily understood that the invention is particularly advantageous in that it enables to benefit from advantages of the formation of beams on board and of the ground formation of beams, while limiting the required bandwidth on the connection link, which can be adapted to the user context.

The invention claimed is:

1. A device (20) adapted to be placed on board a multi-beam telecommunications satellite (2) and configured to relay data between terrestrial terminals (T) and at least one ground station (3), said data being exchanged on a radiofrequency user link between the satellite (2) and the terrestrial terminals (T) by forming beams in a down-path and/or up-path of said user link, said device comprising:
- an on-board beam forming module (200) for forming beams on board in the satellite;
- a ground-formed beam processing module (201) for processing ground-formed beams formed in the ground station (3);
- a routing module (202) for routing signals received from any of the at least one ground station (3) and first and second terrestrial terminals (T), signals of beams formed on board to be sent/received by the first terrestrial terminal being routed towards the on-board beam forming module (200), and signals of ground-formed beams to be sent/received by the second terrestrial terminal being routed towards the ground-formed beam processing module (201) for processing ground-formed beams; and
- an array of antennas (An) for exchanging data on the user link, said array of antennas being used both for the on-board-formed beams and for the ground-formed beams.

2. The device according to claim 1, further comprising:
for forming beams in the down-path of the user link, a module (203) for combining signals of the on-board-formed beams and signals of the ground-formed beams.

3. A satellite (2) configured to be placed in orbit around the earth, characterized in that it comprises the device (20) according to claim 1.

4. A management center (4) for a multi-beam satellite telecommunications system (1), in which system data are exchanged between terrestrial terminals (T) and at least one ground station (3) via at least one multi-beam satellite (2), said system data being exchanged on a radiofrequency user link between the at least one satellite (2) and the terrestrial terminals (T) by forming beams in a down-path and/or an up-path of said user link, comprising:
means for dividing the beams to be formed into two groups of beams:
- a first group of beams that are ground-formed in the ground station (3) to be sent/received by a second of the terrestrial terminals, and
- a second group of beams that are formed on board the satellite (2) to be sent/received by a first of the terrestrial terminals,
wherein signals of the first group of beams are configured to be sent/received by the second terrestrial terminal to a routing module of the at least one satellite for routing signals received from any of the at least one ground station (3) and first and second of the terrestrial terminals (T) in order to be routed towards the ground-formed beam processing module (201) for processing ground-formed beams, and signals of the second group of beams to be sent/received by the first terrestrial terminal being routed towards the on-board beam forming module (200),
data on the user link being exchanged by an array of antennas of the at least one satellite being used both for the on-board-formed beams and for the ground-formed beams.

5. The management center (4) according to claim 4, wherein the beam dividing means are configured to divide the beams into the two groups of beams according to a user context of the terrestrial terminals.

6. The management center (4) according to claim 5, wherein the means for dividing the beams are configured to divide the beams according to at least one criterion among the following criteria:
- a criterion of mobility of a terrestrial terminal or group of terrestrial terminals for which a beam must be formed,
- a criterion of data rate of a terrestrial terminal or group of terrestrial terminals for which a beam must be formed,
- a criterion of localization of a terrestrial terminal or group of terrestrial terminals for which a beam must be formed, and
- a criterion of radiofrequency characteristics of a terrestrial terminal or group of terrestrial terminals for which a beam must be formed.

7. The management center (4) according to claim 4, further comprising:
means for coordinating the co-existence of the on-board-formed beams and the ground-formed beams.

8. A telecommunications system (1), comprising:
at least one multi-beam satellite (2); and
at least one ground station (3) that includes a ground-based beam forming module (301) and a management center (4),
said satellite adapted to be placed in orbit around the earth, and comprising a device (20) that includes an on-board beam forming module (200) for forming beams on board in the satellite, a ground-formed beam processing module (201) for processing ground-formed beams formed in the ground station (3), and a routing module (202) for routing signals received from any of the at least one ground station (3) and first and second terrestrial terminals (T), signals of beams formed on board to be sent/received by the first terrestrial terminal being routed towards the on-board beam forming module (200), and signals of ground-formed beams to be sent/received by the second terrestrial terminal being routed towards the ground-formed beam processing module (201) for processing ground-formed beams, and
an array of antennas (An) for exchanging data on the user link, said array of antennas being used both for the on-board-formed beams and for the ground-formed beams.

9. The system (1) according to claim 8, wherein the at least one ground station (3) further includes a first module (300) for processing the beams formed on board the satellite (2) and a second module (302) for routing signals towards/from the satellite (2), signals of the beams formed on board the satellite being routed towards the on-board-formed beam processing module (300), and the signals of ground-formed beams being routed towards the ground-based beam forming module (301).

10. A method for forming beams on a radiofrequency user link between a multi-beam satellite (2) and terrestrial terminals (T), data being exchanged via the satellite (2) between said terrestrial terminals and at least one ground station (3), comprising:
a step of dividing the beams to be formed into two groups of beams:
- a first group of beams that are formed on board in the satellite (2) to be sent/received by a first of the terrestrial terminals; and
- a second group of beams that are ground-formed in the ground station (3) to be sent/received by a second of the terrestrial terminals;
a step of forming on board in the satellite (2) beams of the first group of beams;
a step of forming, in the ground station (3), beams of the second group of beams;
a step of routing signals of the first group of beams to be sent/received by a second terrestrial terminal being routed towards a ground-formed beam processing module (201) for processing ground-formed beams, and signals of the second group of beams to be sent/received by a first terrestrial terminal being routed towards an on-board beam forming module (200); and a step of using an array of antennas (An) both for the on-board-formed beams and for the ground-formed beams.

11. The method according to claim 10, wherein the beams to be formed are divided into two groups of beams according to a user context of terrestrial terminals (T).

12. The method according to claim 11, wherein the beams formed on board in the satellite (2) are static or semi-static beams, and the ground-formed beams are dynamic beams.

13. The method according to claim 11, wherein the beams are distributed according to a criterion among the following criteria:

a criterion of mobility of a terrestrial terminal or group of terrestrial terminals for which a beam must be formed, a criterion of data rate of a terrestrial terminal or group of terrestrial terminals for which a beam must be formed, a criterion of localization of a terrestrial terminal or group of terrestrial terminals for which a beam must be formed, and a criterion of radiofrequency characteristics of a terrestrial terminal or group of terrestrial terminals for which a beam must be formed.

14. The method according to claim 10, wherein all the beams are formed on board in the satellite (2) when a connection link, between the satellite and the ground station, is subject to considerable disturbances.

15. A satellite (2) configured to be placed in orbit around the earth, characterized in that it comprises a device (20) according to claim 2.

16. The method according to claim 12, wherein the beams to be formed are divided into two groups of beams according to a user context of terrestrial terminals (T).

* * * * *